Patented May 3, 1932

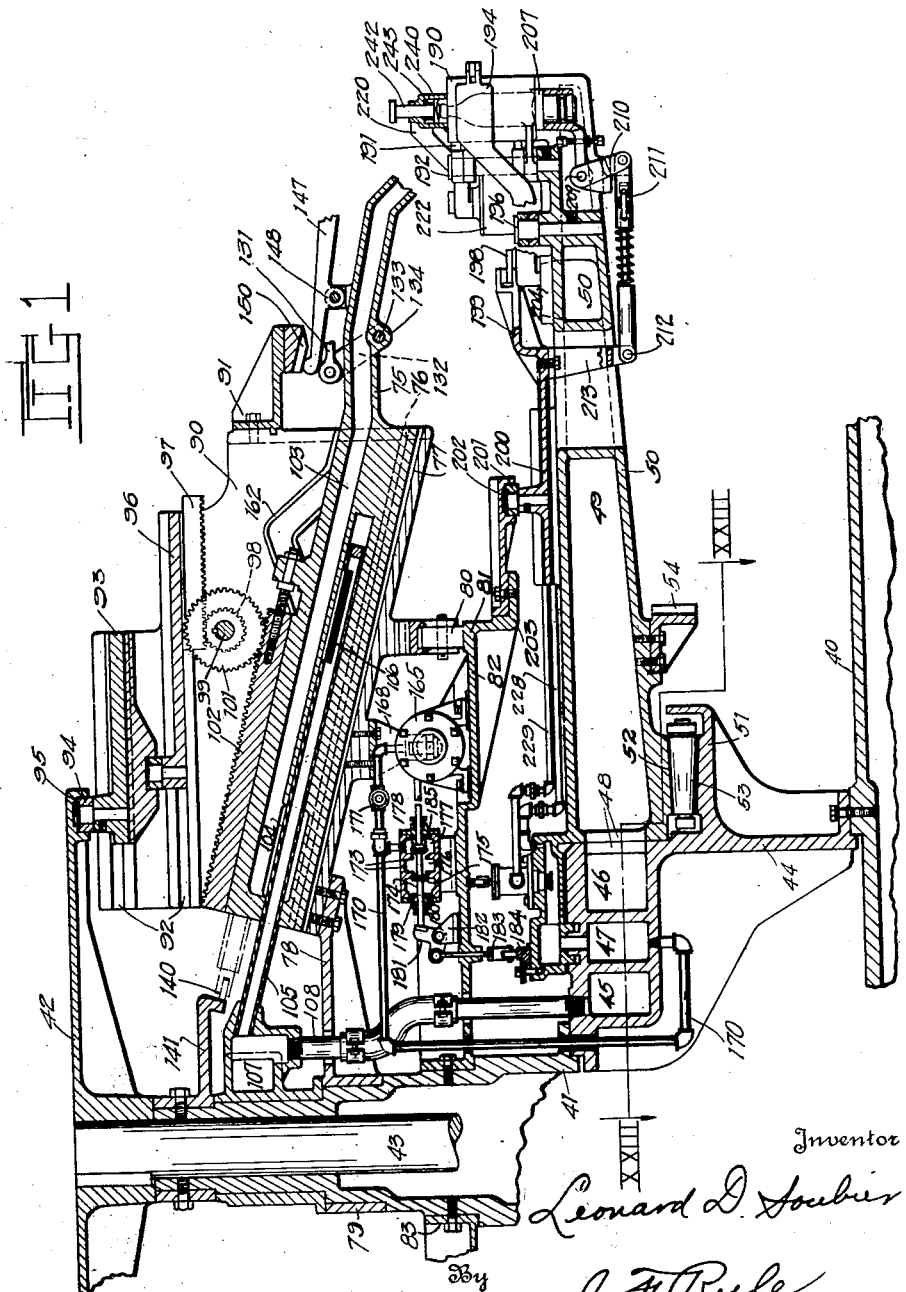

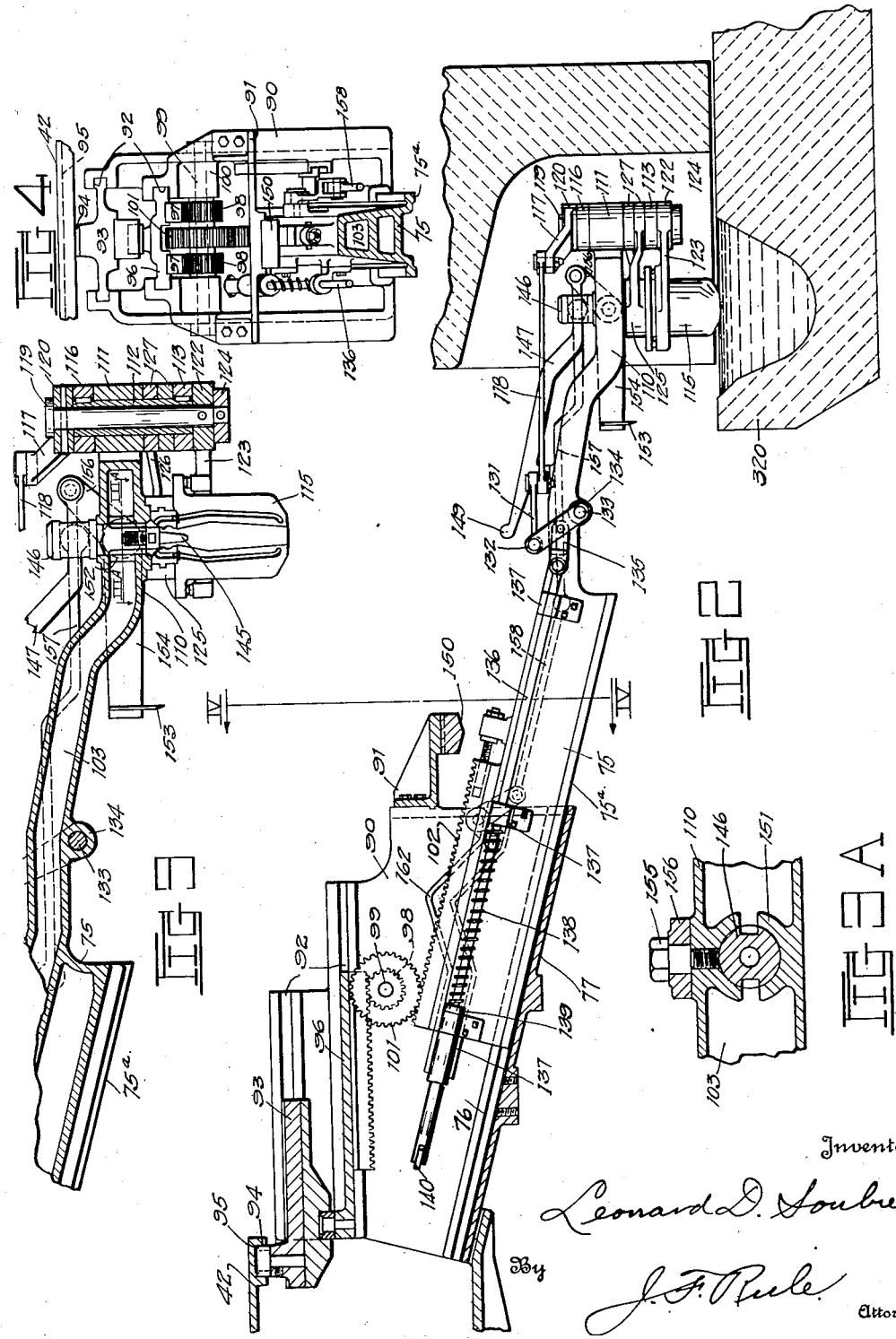

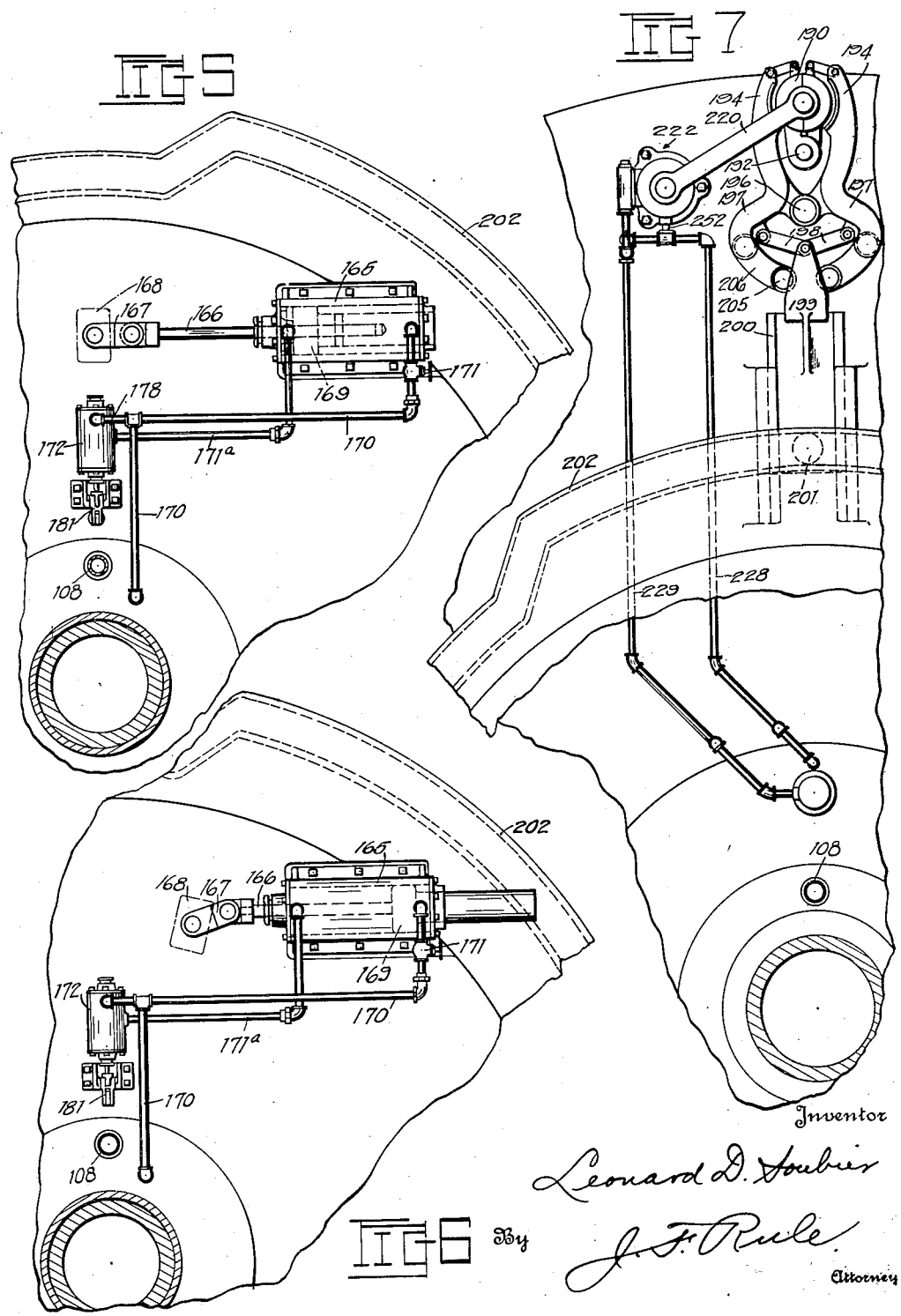

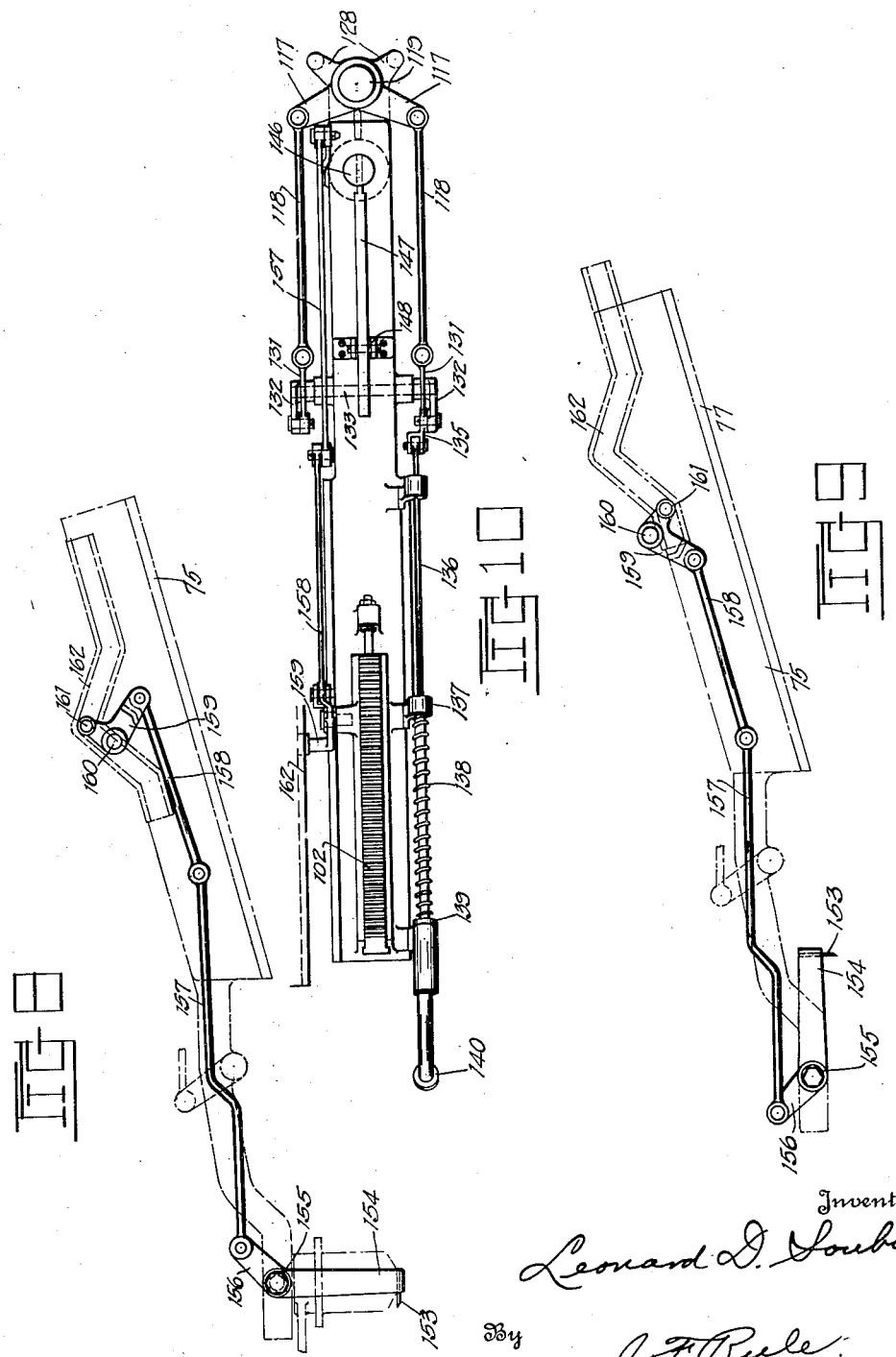

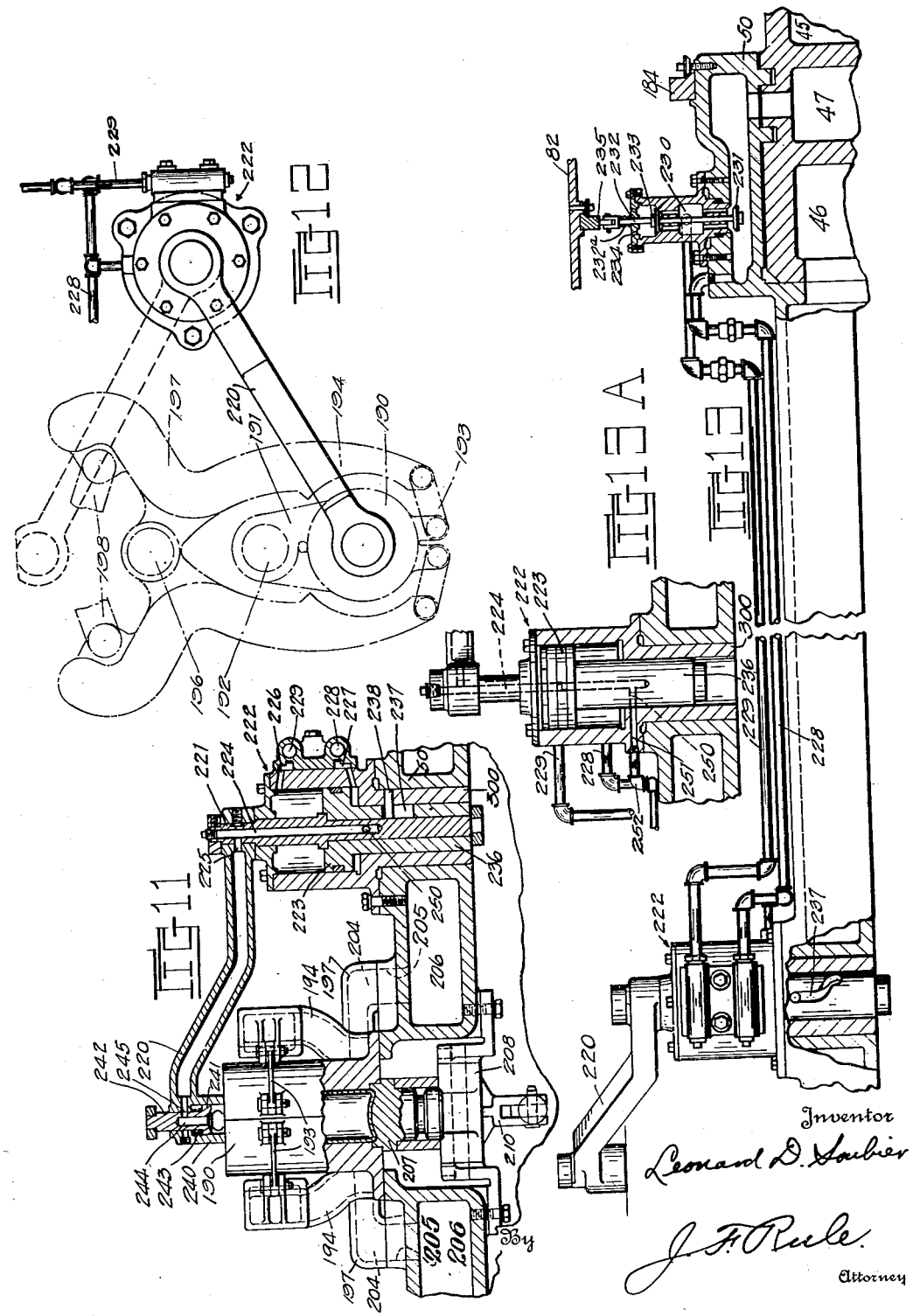

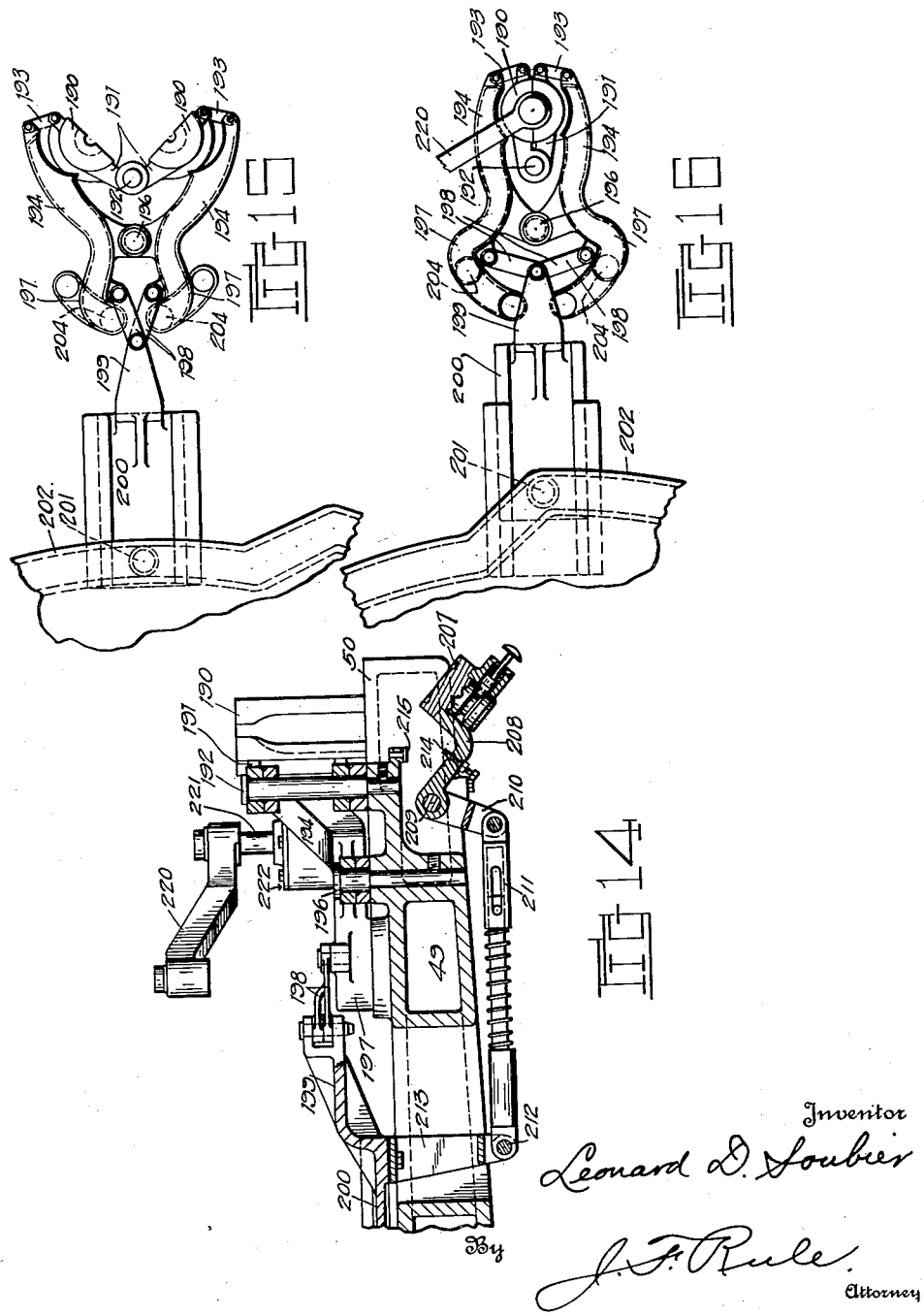

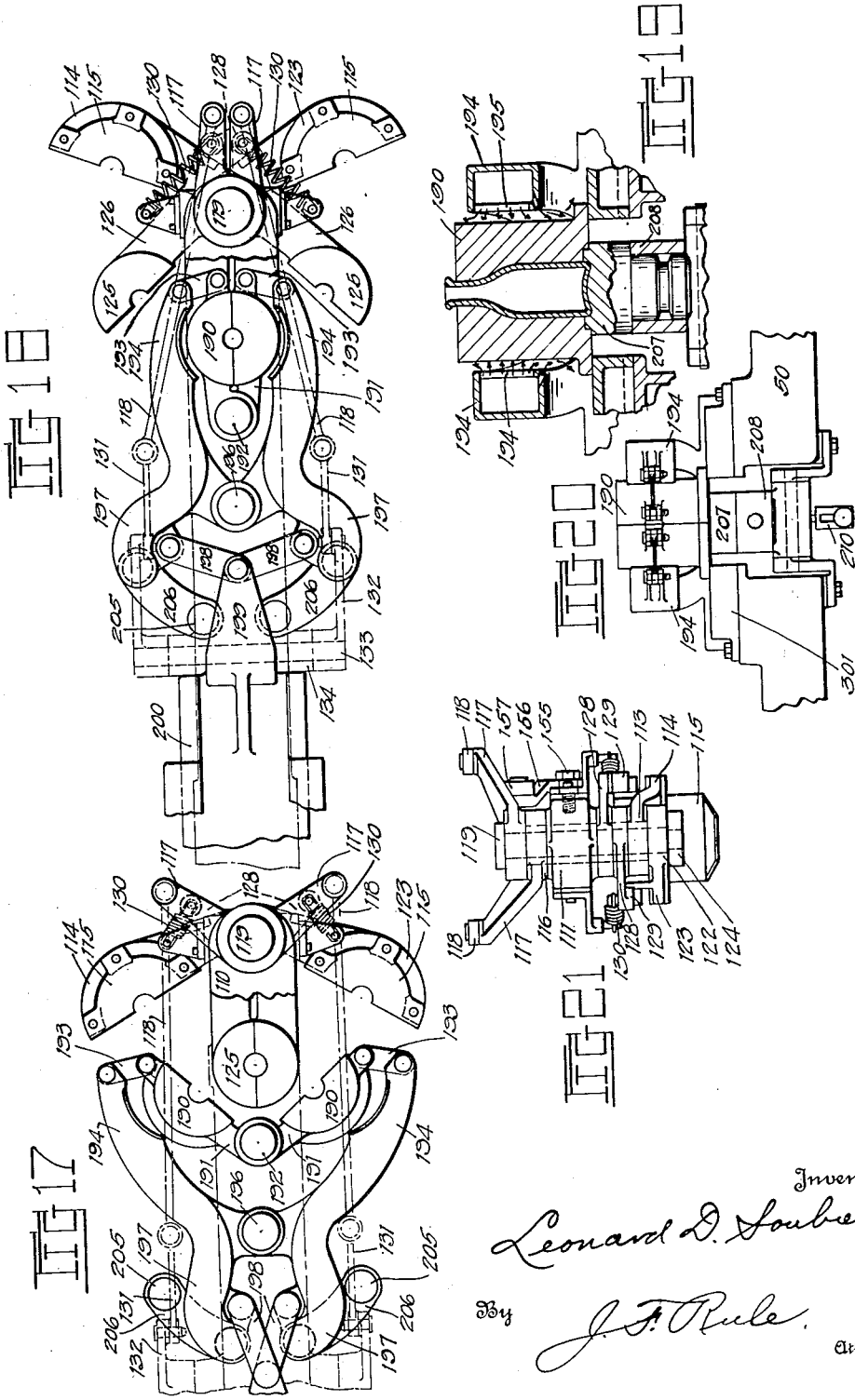

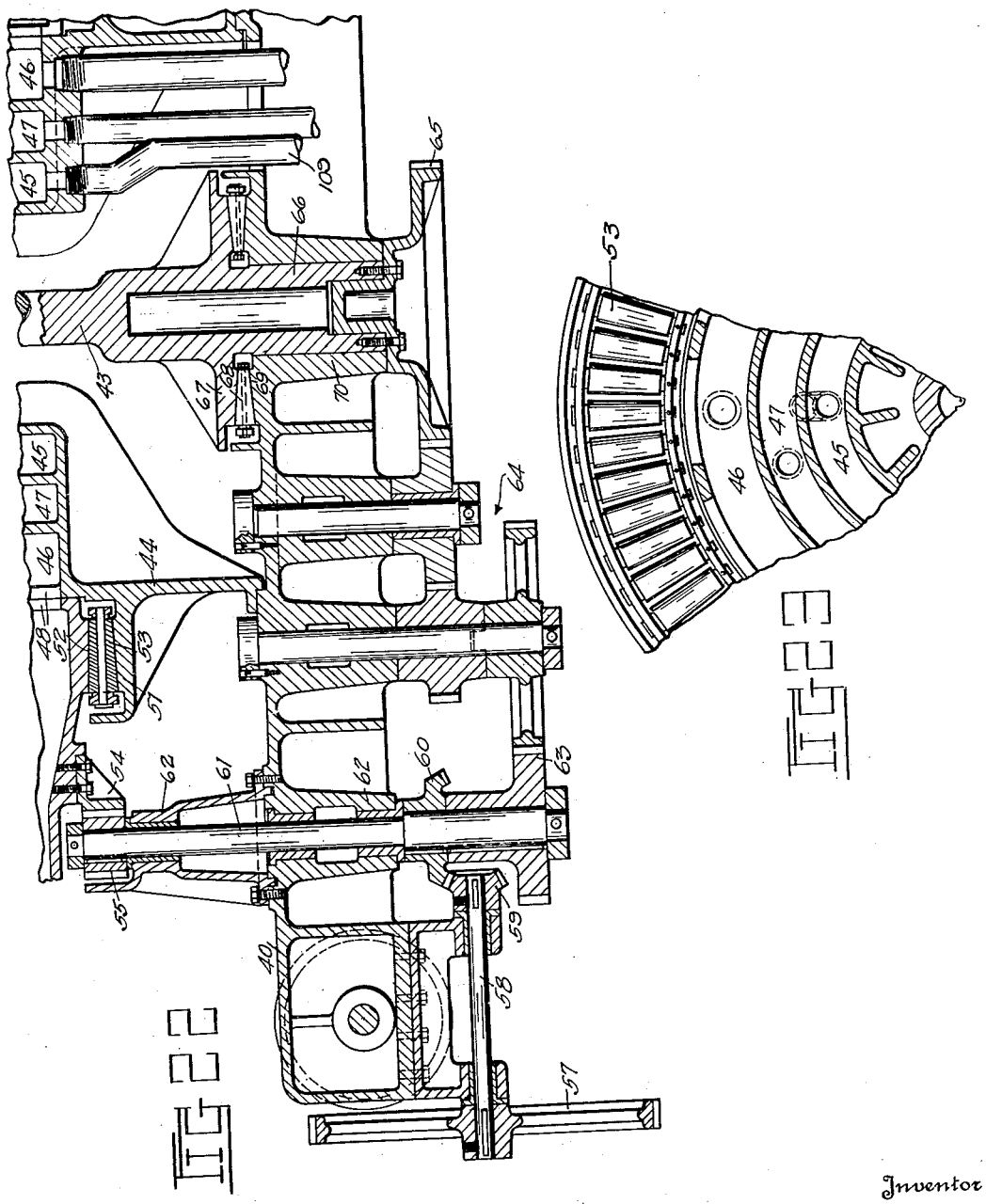

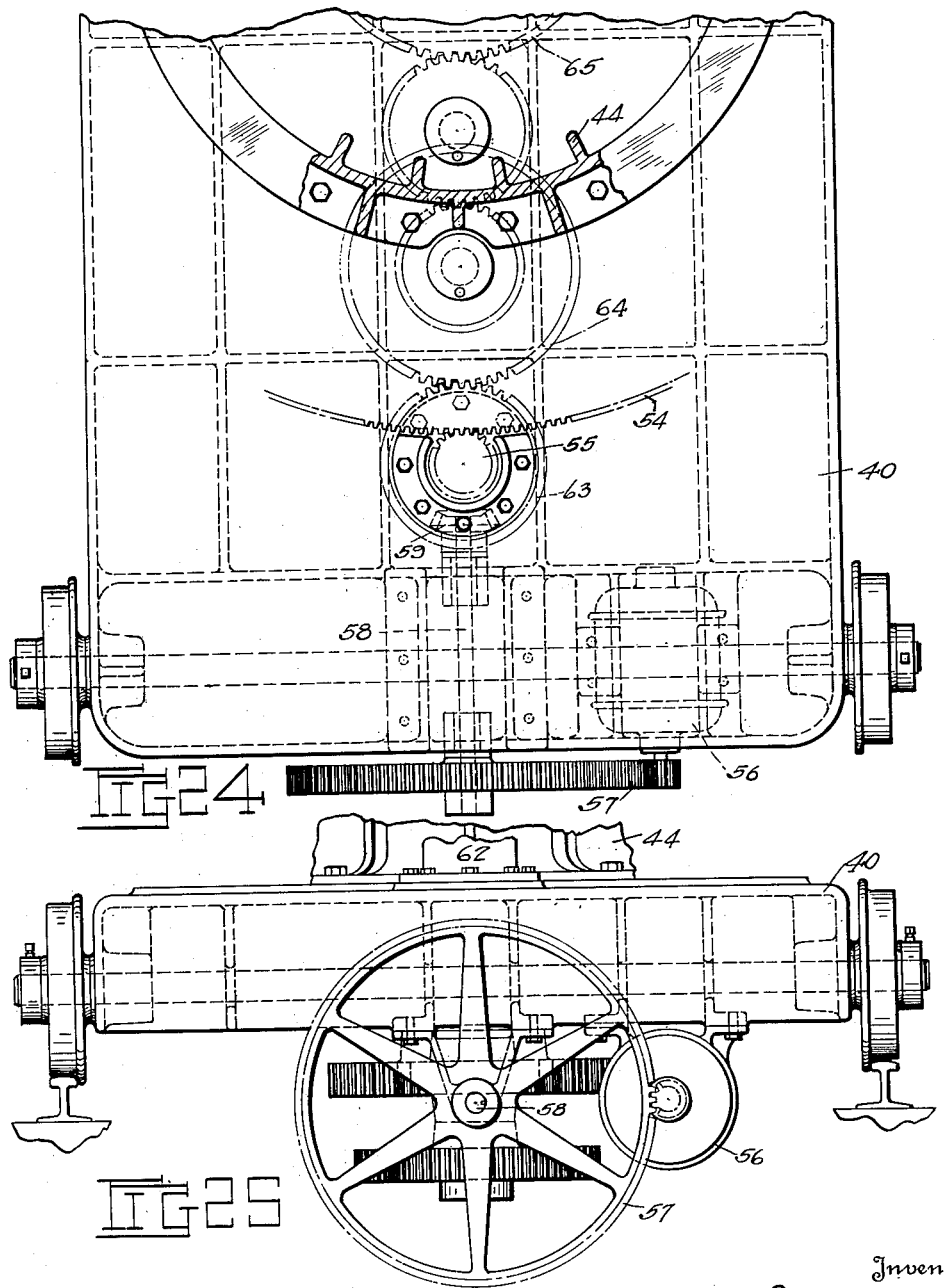

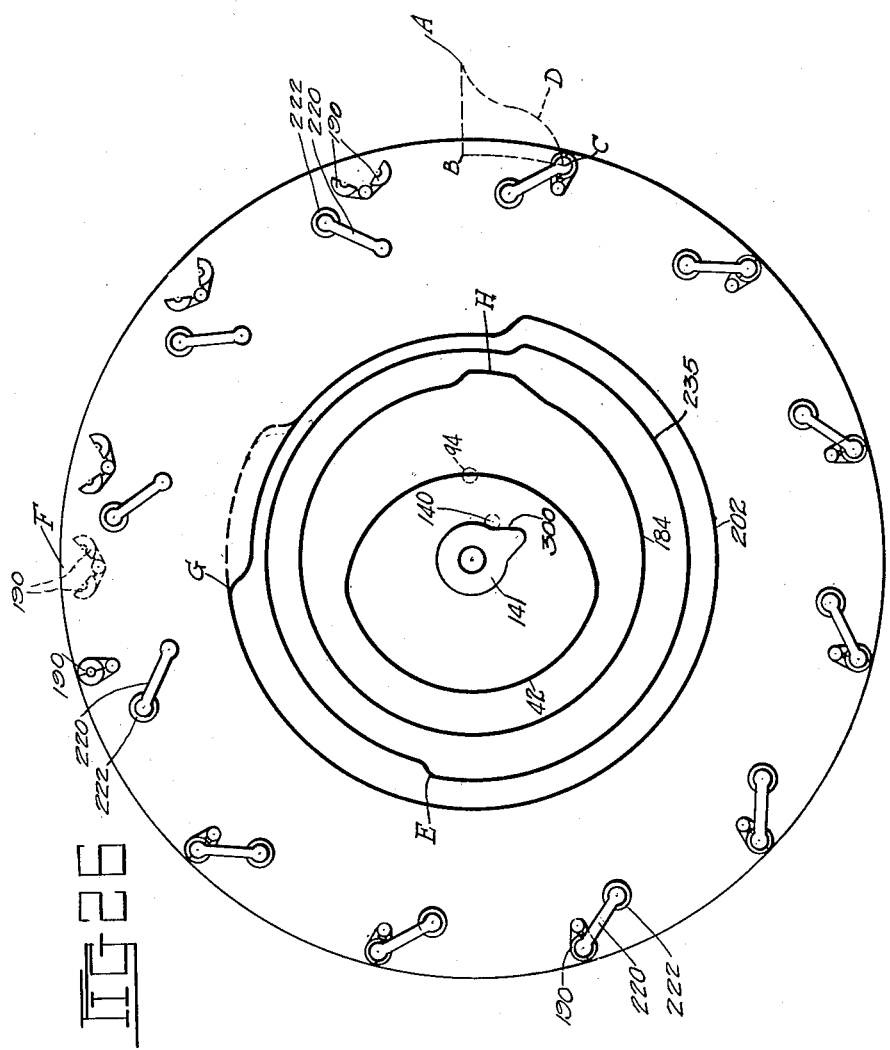

1,856,518

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MACHINE FOR FORMING HOLLOW GLASSWARE

Application filed April 28, 1928. Serial No. 273,483.

The present invention relates to improvements in machines for forming hollow glassware.

In the operation of machines for forming glassware, the blank molds ordinarily employed are idle and perform no useful function during a major portion of their rotation with the mold carriage. This condition is due to the fact that a blank mold after gathering a charge of glass transfers said charge in the form of a parison to a finishing mold at a station approximately 120 degrees from the charging station and is idle from this transfer station until it again reaches the charging station.

An object of the present invention is to provide a compact simply constructed machine for forming hollow glassware and so design the machine that the idle periods of the molds and other associated parts are minimized. To this end, the invention contemplates the provision of an annular series of finishing molds to which parisons are transferred at a predetermined station by a parison forming unit which is common to all of the series of finishing molds. Thus, the necessity for providing parison forming units individual to the finishing molds is avoided and the expense of construction and maintenance is materially decreased.

Another object is to provide a novel and readily controllable mechanism for insuring proper cooperation between the parison forming unit and the finishing molds which are brought in succession to parison transfer position.

Other objects will be apparent hereinafter.

In the accompanying drawings:

Fig. 1 is a sectional elevation through a portion of the machine with the gathering head or parison mold removed for the sake of clarity.

Fig. 2 is a detail sectional elevation showing the parison and neck molds and their supporting and operating mechanisms.

Fig. 3 is a detail sectional view through the parison mold and its supporting arm.

Fig. 3—A is a sectional view taken along the line IIIA—IIIA of Fig. 3.

Fig. 4 is a sectional elevation taken along the line IV—IV of Fig. 2.

Fig. 5 is a fragmentary plan view illustrating the means for oscillating the parison mold carrier, the parts being shown in the position occupied during gathering of a charge of glass and retraction of the mold.

Fig. 6 is a view similar to Fig. 5, showing the operating devices in substantially the position occupied at the time a parison is transferred to a finishing mold.

Fig. 7 is a fragmentary plan view showing a finishing mold, blow head and air pressure supply lines to the latter.

Fig. 8 is a side elevation illustrating the mechanism for actuating the cut-off knife, the latter being shown in cutting and mold closing position.

Fig. 9 is a view similar to Fig. 8, showing the knife retracted.

Fig. 10 is a plan view of the charge gathering mechanism or ram.

Fig. 11 is a transverse sectional elevation of the finishing mold and blowing head, the latter being positioned to apply final blowing air to the article in the mold.

Fig. 12 is a plan view showing the relative positions assumed at times by the finishing mold and the blowing head.

Fig. 13 is a sectional view illustrating the means for supplying air pressure to the final blowing head.

Fig. 13—A is a sectional elevation showing the blowing head control means in position to hold the head above the mold.

Fig. 14 is a longitudinal sectional view through a finishing mold and bottom plate showing the operating connections therebetween.

Fig. 15 is a fragmentary plan view showing the finish mold at the blank or parison transfer station.

Fig. 16 is a view similar to Fig. 15, showing the finish mold closed about a parison and the blowing head in position to blow the parison to its final shape.

Figs. 17 and 18 are views similar to Figs. 15 and 16, respectively, but showing the elements in detail.

Fig. 19 is a transverse sectional view through the finishing mold, showing its relation to the hollow supporting arms which conduct cooling air to the outer surfaces of the mold.

Fig. 20 is a fragmentary front elevation of a finishing mold associated with an adapter whereby the machine may be utilized to produce ware of various heights.

Fig. 21 is a front elevation of the blank mold and operating mechanism therefor.

Fig. 22 is a detail sectional view illustrating a portion of the mechanism for rotating the finishing mold carriage and parison mold reciprocating cam.

Fig. 23 is a fragmentary horizontal sectional view taken substantially along the line XXIII—XXIII of Fig. 1.

Fig. 24 is a fragmentary plan view with parts in section, showing the driving mechanism also illustrated in Fig. 22.

Fig. 25 is a side elevation of the mechanism shown in Fig. 24.

Fig. 26 is a diagrammatic plan view showing the various mold operations and the relation of the mold and blowing head movements to each other.

In the drawings disclosing the preferred embodiment of the present invention, the machine comprises a base 40 supporting a vertical central hollow pillar 41, consisting of a series of superposed sections surmounted by a continuously rotating cam 42 which is keyed to and driven by a shaft 43 extending downwardly through said pillar.

The base or bottom section 44 (Fig. 1) of the stationary central pillar 41 is bolted or otherwise secured to the base 40 and includes a series of concentric chambers at its upper end, the inner chamber 45 being a vacuum chamber, the outer chamber 46 containing low pressure air and the inner intermediate chamber 47 containing high pressure air. The low pressure air chamber communicates through openings 48 with longitudinal passageways 49 in the finishing mold frame 50, through which passageways the low pressure air is directed for cooling the molds as will be described hereinafter. This base section 44 of the central pillar 41 is also formed with a horizontal annular flange 51 between which and a bearing surface 52 on the finishing mold frame 50, an annular series of anti-friction roller bearings 53 is interposed. A ring gear 54, secured to the lower side of the finishing mold frame 50 and meshing with a driving pinion 55, provides means whereby said frame may be rotated continuously or intermittently by any suitable motor or the like.

The finishing mold frame 50 is continuously driven through said pinion 55 and ring gear 54 by a motor 56 (Figs. 24 and 25), continuously rotating a gear 57 on one end of a horizontal shaft 58, the latter carrying a bevel gear 59 (see Fig. 22) running in mesh with a bevel gear 60 which is keyed to a vertical shaft 61 journalled in suitable bearings 62 on the base 40. The shaft 61 has keyed to its upper end the pinion 55 heretofore referred to as running in mesh with the ring gear 54. Keyed to the lower end of the shaft 61 is a spur gear 63 which, through a train of gears 64, transmits rotary motion to a spur gear 65 fixed to the lower tubular end 66 of the aforementioned vertical shaft 43 which extends axially through the central pillar 41. This tubular portion 66 of the shaft embodies an annular radial flange 67 running on roller bearings 68 supported in a suitable retainer 69 at the upper end of the vertical bearing 70 formed in the base 40.

The charge gathering and parison forming means are embodied in a single unit (Figs. 2 and 3), there being a single parison mold common to all of an annular series of finishing molds supported on the finishing mold frame 50 referred to above. This charge gathering and parison forming unit, frequently referred to as a ram, comprises an elongated frame 75 movable radially of the machine along an inclined path between a charge gathering station and a blank transfer station, said frame formed with longitudinal ribs 75ª arranged in inclined guideways 76 at the lower margins of vertical side members 90 on the base 77. The inner upper end of the frame 77 is suitably secured to an arm or bracket 78 (Fig. 1) extending radially from a collar 79 encircling an intermediate portion of the stationary pillar 41 on which said collar is free to oscillate. The front end portion of the ram supporting member or base 77, carries a roller 80 which rides upon a stationary track 81 formed on the upper side of a circular table 82, having a collar 83 fixed to an intermediate portion of the central stationary pillar 41. Thus, said table 82 which carries a finishing mold cam as will be described, is held against rotation.

The base frame 77 (Figs. 1 and 2) which supports the radially movable frame or ram 75 is formed with vertical side members 90, connected at their outer ends by a cross member 91 and provided at their upper margins with vertically spaced pairs of radial horizontal slideways 92. The upper pair of slideways 92 support a slide 93 therein carrying a cam roll 94 running in the path 95 of the cam 42. This slide 93 (Fig. 1) is suitably connected to a slide 96 movable radially of the machine in the lower pair of slideways 92, the latter slide 96 carrying on its lower side a pair of rack bars 97 running in mesh with pinions 98 (Figs. 1 and 4) mounted on a transverse shaft 99 whose ends are journalled in bearings 100 formed on the inner faces of the vertical side members 90 of the ram supporting frame 77. A large gear or pinion 101 is fixed to the transverse shaft 99 between the pinions 98 and runs in mesh with a rack bar 102 secured to the upper side of the frame 75 and adjustable longitudinally of said frame. Thus, with continuous rotation of the cam 42 (Fig. 1), reciprocation of the ram radially of the machine at regular intervals may be obtained.

The frame 75 (Figs. 1, 2 and 3), constituting the ram, is cored to form a vacuum passageway 103 extending longitudinally of said frame and opening at its inner end into an annular chamber 104 surrounding a pipe 105 telescoping within a portion of the frame 75. The outer end portion of the pipe 105 is formed with an annular series of longitudinal slots 106, substantially of the same length as that of the annular chamber 104 and adapted, when the ram is in its outermost position, to provide communication between said pipe 105 and the vacuum passageway 103. The inner end of the pipe 105 opens into a chamber 107 which communicates through a vertical pipe 108 including a flexible section, with the aforementioned vacuum chamber 45, the latter being connected to a vacuum pump or the like (not shown) through a pipe 109 as shown in Fig. 22. Thus, with reciprocation of the frame or ram 75, vacuum is applied to the passageway 103 at regular intervals for a purpose presently apparent.

The outer end of the ram (Figs. 2, 3 and 21) terminates in a horizontal portion 110 whose outer extremity is formed into a vertical bearing 111 which supports blank and neck mold mechanism. A sleeve 112 projects through opposite ends of the bearing 111 and has its lower end keyed to a collar 113 (Figs. 3 and 21) formed integrally with one arm 14 of a pair of blank mold supporting arms 114 and 123, which arms support the sections of the partible blank or parison mold 115. The upper end of the sleeve 112 is keyed to a collar 116 carrying one of a pair of arms 117 (Figs. 2, 3, 17 and 21), which arms are pivoted to operating rods 118. A shaft 119 extends through the opposite ends of the sleeve 112 and is connected at its upper end by a collar 120 to the other of said arms 117. The lower end of the shaft 119 is pinned to a collar 122 carrying the arm 123. A retaining collar 124 is fixed to the lower end of the shaft 119 for obvious purposes. A partible neck mold 125 (Figs. 3, 17 and 18) cooperates with the upper end of the blank mold 115 and is connected through arms 126 to collars 127 which are freely rotatively mounted on the sleeve 112 between the bearing 111 and the collar 113 (Fig. 3). Arms 128 formed on the neck mold supporting collars 127 carry depending lugs 129 which are engaged by the blank mold supporting arms 114 and 123 after the blank mold sections have separated a predetermined degree. Coil springs 130 (Figs. 17 and 18) normally yieldingly hold the neck mold 125 in closed position as shown in Fig. 17.

The blank or parison mold operating mechanism (Figs. 2, 3 and 10) includes the rods 118 above referred to as being connected to the arms 117, said rods also connected through compensating links 131 to rock arms 132 fixed to opposite ends of a rock shaft 133 journalled in a transverse bearing 134 on the ram frame 75. One of these rock arms is connected through a link 135 (Figs. 2 and 10) to the outer end of a push rod 136 slidable longitudinally of the ram in bearings 137 fixed to one side of the ram frame 75. A coil spring 138 encircles the push rod 136 between the inner face of one of the bearings 137 and a collar 139 on said push rod, said spring operating to yieldingly hold the rod in position to close said molds. The inner end of this rod 136 carries a cam roll 140 (Figs. 1, 2 and 10), engaging a cam 141, the latter non-rotatively fixed to the upper portion of the stationary central pillar 41 just below the rotating cam 42.

The blank or parison mold 115 is equipped with a plunger 145 (Fig. 3) fixed to a carrier 146 (see also Figs. 2 and 10) mounted upon the forward end of a lever 147, said lever being fulcrumed near its other end to a transverse hinge pin 148. The upper rear end 149 of the lever 147 is adapted to engage a cam 150 (Fig. 1) at times whereby the plunger is lifted out of engagement with the glass in the molds. The plunger carrier 146 (Figs. 3 and 3—A) is reciprocable in a guide sleeve 151 (Fig. 3—A) extending vertically through the chambered forward end 110 of the ram frame 75, said sleeve having radial slots 152 providing communication between the vacuum passageway 103 and the mold cavities. As stated above, vacuum is applied to the mold cavities through the passageway 103 when the ram is projected to its outermost limit, such projection causing register of the slots 106 with the annular chamber 104 (Fig. 1), thereby providing communication between the vacuum pipe 105 and said passageway 103.

After a charge of glass has been drawn into the blank and neck mold cavities and the molds as a unit are being moved away from the charge gathering position, it is necessary to remove the strings of glass from the lower end of the charge in the mold before the latter has moved beyond the margin of the container for the supply body of molten glass. To perform this function and temporarily close the bottom of the mold, a cut-off (Figs. 3, 8, 9 and 10) is carried by the ram. This cut-off comprises a shear blade 153 on a cut-off arm 154 pivoted to the horizontal portion 110 of the ram frame 75 by a hinge bolt 155 or the like (Fig. 3—A), the axis of said hinge pin 155 extending at right angles to and through the axis of the plunger carrier 146 within the horizontal portion 110. A rock arm 156 (Figs. 8, 9 and 10) fixed to the upper end of the cut-off arm 154 is pivoted at one end to an operating rod 157, the inner end of the latter being connected to a link 158 and through said link to one arm of a bell crank lever 159. This lever is fulcrumed to a transverse hinge pin 160 on the frame 75. The other arm of said lever carries a cam roll 161 running in an angular cam 162 mounted on the inner face of one of the side members 90 (Fig. 2) of the ram supporting frame 77. The track of the cam 162 is of such angular formation that immediately following initial retractive movement of the ram from the charge gathering position, the bell crank lever 159 is rocked to swing the cut-off from the position shown in Fig. 9 to that shown in Fig. 8, thereby severing the charge from the supply body of glass.

According to the present invention, the annular series of finishing molds (Fig. 1) is continuously rotated, in consequence of which transfer of parisons to the finishing molds requires a certain degree of circumferential movement of the parison or blank mold 115 with each finishing mold while the transfer is being effected. For this purpose, there is provided an air motor 165 supported on the stationary circular table 82 (Figs. 1, 5 and 6), one end of the piston rod 166 being connected through a compensating link 167 (Figs. 5 and 6) to the lower end of an arm 168 depending from the ram supporting frame 77. This motor 165 is operated in timed relation to movements of the continuously rotating cam 42 to oscillate the ram about the axis of the mold carriage, so that the parison forming unit may be properly positioned relative to finishing molds to which parisons are being transferred. This air motor 165 (Figs. 5 and 6) is provided with a differential piston 169. Constant air pressure is supplied to one end of the air motor through a pipe 170 which leads to the high pressure air chamber 47. This air pressure is controllable by a valve 171 (Fig. 5) in the pipe 170. Variable air pressure is periodically applied to the end of the piston 169 of greater area by way of a pipe 171ª which interconnects the air motor cylinder and a valve box 172. This valve box (Fig. 1) includes three longitudinally spaced chambers, the partition walls 173 being formed with axial openings by which communication between all of said chambers may be established. A valve stem 174 extends axially through said openings in the partitions 173 and carries valves 175 adapted to be opened one at a time by movement of said stem. The variable pressure pipe 171ª is directly connected to the intermediate chamber 176, so that when one of the valve disks 175 is moved to open position, communication between said chamber 176 and an end chamber 177 is established, the latter being connected to the air pressure supply pipe 170 by way of a branch pipe 178. The chamber 179 at the opposite end of the valve box opens to the atmosphere at all times through a series of apertures 180. A bell crank lever 181 (Figs. 1, 5 and 6) is pivoted to a bracket 182 adjacent the inner end of the valve box, and through a push rod 183 is periodically rocked by a continuously rotating circumferentially adjustable cam 184 which moves with the finishing mold frame 50.

Constant air pressure applied through the pipe 170 to one end of the air motor cylinder and controlled by the valve 171, serves to hold a ram supporting frame to which the rod 166 is connected, in a position to permit radial projection of the blank mold to a charge gathering position. Just before the parison forming unit reaches the path of movement of the finishing mold during retraction of the former, the cam 184 rocks the bell crank lever 181 to unseat the valve 175 and provide communication between the intermediate chamber 176 and the outer end chamber 177 so that variable air pressure may be applied through the branch pipe 178, said intercommunicating chambers and the variable air pressure pipe 171, to the opposite end of the air motor cylinder. Such application of air pressure moves the piston 169 to the opposite end of the air motor cylinder and thereby causes the parison forming unit to move with one of the finishing molds a predetermined distance along the finishing mold path so that a parison may be transferred to said finishing mold. Upon completion of the transfer, the bell crank lever 181 resumes its former position, partly due to the action of a coil spring 185 bearing against one of the valves 175, so that the application of variable air pressure to the cylinder through the pipe 170 is shut off, and communication is established between the intermediate chamber 176 and the inner end chamber 179. Thus, the constant air pressure operates to return the piston 169 to the former position shown in Fig. 5, such return being facilitated by escape of the air pressure at the opposite side of the piston to the atmosphere by way of the pipe 170, intermediate and inner end chambers 176 and 179, respectively, and the apertures 180.

Each finishing mold unit on the finishing mold frame 50, comprises partible sections 190 (Figs. 1, 11, 14 and 17) hinged to a vertical hinge pin 192 rising from the outer end portion of the casting forming the finishing mold frame 50. The outer ends of the finishing mold sections 190 are connected through links 193 to hollow arms 194 which are provided with exhaust openings 195 (Fig. 19) through which low pressure cooling air is exhausted to cool the finishing molds. These arms are hinged at their inner ends to a vertical hinge pin 196 (Figs. 14 and 17) rising from the finishing mold frame 50. Hollow rearward extensions 197 are formed on the hollow arms 194 and are connected through links 198 to a slide block 199 at one end of a slide 200 which carries a cam roll 201 running in a stationary cam 202 fixed to a bracket 203 on the table 82. A portion (not shown) of this cam is circumferentially adjustable to change the ware ejecting station as will be apparent hereinafter. Through radial movement of the slide 200, the links 198 and arms 194 above referred to are actuated to alternately open and close the finishing mold.

Each of the extensions 197 is formed with a downwardly directed inlet opening 204 at its outer end, adapted for alternate communication with upwardly opening ports 205 in the upper walls of branch passageways 206 extending radially from the chamber 49 (Figs. 1 and 11). These ports 205 are arranged in pairs and so positioned that when the finishing mold is closed, one of each pair of ports registers with a downwardly opening inlet 204 while the other pair of ports register with said inlet openings when the finishing mold is open. While one pair of ports is in register with the inlet openings 204, the other pair of openings permit upward currents of cooling air to contact with the ram and certain other elements carried thereby. Thus, means are provided for cooling the finishing molds and at the same time preventing excessive heating of the ram.

A bottom plate 207 (Figs. 1 and 14) is carried on arm 208 hinged to a pin 209 on the finishing mold frame at a point adjacent and below the mold hinge pin 192, said arm being connected through a crank arm 210 to a yielding connector 211, one end of which is pivoted through a pin 212 to the lower end of a bracket arm 213, the latter being bolted or otherwise suitably connected to the finishing mold slide 200. A stop (Fig. 14) such as a set screw 214 is carried by the bottom plate supporting arm 208 and when the bottom plate is raised for cooperation with the finishing mold, engages an abutment 215 formed on the finishing mold frame 50. By adjusting this screw 214, proper positioning of the bottom plate 207 relative to its finishing mold is assured.

After a parison is enclosed in its finishing mold, a final blowing device is positioned over the upwardly projecting end of the parison to permit application of air pressure internally of the blank to give the latter its final shape. This device (Figs. 7 and 11 to 14, inclusive) comprises a hollow arm 220 of angular formation secured at one end to a piston rod 221 of an air motor 222, said piston rod being suitably connected to a piston 223 and having an axial opening 224 therethrough. This opening 224 communicates with the interior of the arm 220 through a radial port 225 (Fig. 11). This arm 220 is movable vertically and laterally relative to the finishing mold for moving a sleeve 240 carried by said arm, into and out of an operative position on the mold. Vertical movement is effected by alternately applying air pressure to opposite faces of the piston 223 by way of upper and lower ports 226 and 227, respectively. The lower port 227 (Figs. 11 and 13) communicates through a constant air pressure supply pipe 228 with the high pressure air chamber 47 (Figs. 1 and 13).

The upper port 226 communicates through a variable air pressure supply pipe 229 with a valve box 230 including a cam actuated valve 231 (Fig. 13) which is periodically opened by a stationary circumferentially adjustable cam 235 on the table 82, to permit application of air pressure to the upper side of the piston 223, which piston is of the differential type. This valve 231 is fixed to a stem 232 which also carries a second valve disk 233. This latter disk 233, when the valve 231 is unseated, operates to prevent escape of air pressure to the atmosphere. When the lower valve 231 seats to shut off application of air pressure to the upper end of the air motor cylinder, and constant air pressure operates to raise the piston, said valve disk 233 is unseated to permit escape of air pressure from above the piston to the atmosphere by way of openings 234. Thus, the arm 220 may be rapidly raised and lowered.

Oscillation of the arm 220 (Figs. 11 and 13—A) is effected simultaneously with vertical movement thereof by forming a depending sleeve 236 on the piston, said sleeve enclosing the lower solid portion of the piston rod and formed with an angular slot 237 (Fig. 11) into which projects a pin 238 fixed to a sleeve 300 on the motor cylinder. The sleeve 236 and piston rod move vertically as a unit and due to the peculiar shape of the angular slot 237, vertical movement of the piston 223 causes oscillation of the rod 221 and sleeve 236 and resultant lateral movement of said arm 220.

The outer end of the arm 220 is formed with a downwardly opening sleeve 240 which encloses a vertically movable disk 241 adapted to seat upon the upper or neck end of the parison during blowing of the latter in its finishing mold. A stem 242 carries the disk 241 and is slidable upwardly through an axial opening in the upper end of said sleeve 240. A coil spring 243 encircles said stem and yieldingly exerts a downward pressure on said disk to snugly seat the latter on a parison. An axial opening 244 extending through the disk 241 and a portion of the stem 242, communicates at times through aligned ports 245 in the stem 242 and arm 220 with the interior of said arm when the disk 241 is seated upon an article in the finishing mold. Upon lifting the arm 220 relative to the upper end of the finishing mold, the coil spring 243 expands and moves the stem 242 to shut off communication between the axial opening 244 and the hollow arm 220.

The piston rod 221 and sleeve 236 (Figs. 11 and 13—A) are formed with aligned radial ports 250, the inner end of which opens into the lower portion of the axial passageway 224 through said piston rod, while the outer end of the aligned ports registers at times with a radial port 251 in the air motor cylinder wall, said latter port connected to a short pipe section 252 (Figs. 7 and 13—A) leading to said constant air pressure supply pipe 228. Thus, when the piston 223 is lowered to position the sleeve 240 and disk 241 over the neck of a parison as shown in Fig. 11, the ports 250 and 251 are brought into register with each other so that air pressure from the chamber 47 may flow through the constant air pressure supply pipe 228, the axial passageway 224 in the piston rod 221 and thence through the hollow arm 220 and aligned ports 245 for internal application to the article.

Upon completion of the blowing operation, the cam 235 (Fig. 13) which unseats the valve 231, permits the spring 232ª to close said valve 231 so that the piston 223 is again raised to the upper end of the air motor cylinder, thereby lifting the arm 220 and disaligning the ports 250 and 251 to shut off flow of air pressure to the interior of the parison which has now been blown to its final shape.

In operating a machine constructed as described, the finishing mold carriage 50 is preferably (though not necessarily) continuously rotated so that the finishing molds which are arranged in an annular series about the pillar 41 are brought in succession to a position below the ram which carries the parison forming unit. As each finishing mold approaches a position below the ram, the slide 200 (Fig. 1) is moved radially inward by the cam 202 to thereby open said mold as shown in Figs. 15 and 17. This mold is held open by the cam 202 until the parison to be transferred is properly positioned between the finishing mold sections in a manner which will now be described.

In timed relation to movement of the finishing molds, the ram 75 is projected radially toward a charge gathering position "A" (Fig. 26) by a rack and pinion mechanism (Fig. 1) actuated by continuous rotation of the cam 42 (Figs. 1 and 26) at the upper end of the driving shaft 43. As the ram moves forwardly in the supporting frame 77, the plunger control lever 147 frees itself from influence of the cam 150 (Fig. 1) and is rocked by the weight of the plunger 145 to project the latter downwardly into the neck and blank molds 125 and 115, respectively. This outward movement of the ram permits the coil spring 138 (Figs. 2 and 10) to expand and through the rock arms 132 and connecting links and rods 131 and 118, close the blank and neck molds just prior to dipping the former into a supply body of molten glass in a tank 320 at the position "A" (Fig. 26).

By the time the ram reaches its outermost position, the pipe 105 and annular chamber 104 (Fig. 1) have come into communication with each other by way of the slots 106, permitting application of vacuum through the passageway 103 to the mold cavities to thereby gather a charge of glass into the mold. Immediately upon completion of the gathering of a charge, the rack and pinion mechanism (Fig. 1) is actuated by the rotating cam 42 to retract the ram, such retraction simultaneously lifting the mold away from the glass. This retractive movement causes the stationary cam 162 (Figs. 9 and 10) to rock the bell crank lever 159 to thereby swing the cut-off knife across the lower end of the blank mold. Retraction of the ram and elements carried thereby follows a straight line radially of the machine between the charge gathering position "A" and the machine axis, until the mold axis coincides with the path of finishing mold movement. At this point, a section of the cam 184 (Figs. 1 and 26) which continuously rotates with the finishing mold frame, rocks the bell crank lever 181 to actuate the valve in the valve box 172 to apply variable air pressure to the air motor 165 whereby said air motor operates to move the frame and blank mold as a unit along the path of travel of the finishing mold a predetermined distance and at the same speed as that at which the finishing mold is traveling. It is understood that retraction of the blank mold to the station "B" (Fig. 26) at which circumferential movement of the mold begins, operates to reopen the blank mold to the position shown in Fig. 17. Such opening of the mold is the result of longitudinal movement of the push rod 136 (Figs. 2 and 10) caused by engagement between the cam roll 140 and the cam 141 (Fig. 1).

During circumferential movement of the blank mold with one of the finishing molds, the neck mold 125 suspends the bare parison between the sections 190 of the finishing mold and while these molds move together from station "B" to station "C" (Fig. 26), the stationary cam 202 (Fig. 1) moves the slide 200 radially outward to thereby close the finishing mold about the suspended parison. Upon complete closing of the finishing mold, the cam roll 140 (Figs. 1 and 26) strikes an angular portion 300 on the cam 141 which causes further longitudinal movement of the push rod 136 (Fig. 10) to thereby give the blank mold 115 additional opening movement which, as described above, causes opening of the neck molds in the fashion shown in Fig. 18. Thus, the transfer of a parison from the blank mold to one of the finishing molds is completed.

Immediately upon opening of the neck mold, the air motor control valve (Figs. 1, 5 and 6) is operated by the bell crank lever 181 to move the ram to its original position and thereby return the blank mold to the gathering position "A." Simultaneously with this return movement, the continuously rotating cam 42 at the upper end of the shaft 43, actuates the rack and pinion mechanism (Fig. 1) to project the blank mold to the gathering station "A." This compound movement of the ram and mold results in the mold following a path "D" substantially as indicated by the dotted lines in Fig. 26. Thus, a minimum period of time is required to move the blank mold from the parison transfer position to the gathering position. This projection of the blank mold into the glass automatically applies vacuum to said blank mold as previously described, and the cycle of operations above outlined is repeated, the parison formed being transferred to the next succeeding finishing mold.

The preceding finishing mold which has just enclosed the parison, continues its circumferential movement, during which the cam 235 (Figs. 13 and 26) opens the valve 231 to apply variable air pressure to the upper end of the air motor 222 (Fig. 11) and thereby seat the blowing head or sleeve 240 upon the upper end of the finishing mold and simultaneously bring the ports 250 and 251 (Fig. 13—A) into register with each other so that air pressure may be directed into the upper end of the parison to blow the latter to its final shape in the finishing mold. When this particular mold arrives substantially at the point "E" on the stationary cam 235 (Figs. 13 and 26), the valve 231 is again seated due to the cam formation at this point whereby the variable air pressure is shut off from the air motor 222 and the latter operates to lift and laterally move the blow head relative to the finishing mold. From this station "E" to station "F," the article is permitted to set and is subjected to chilling by the metal of the finishing mold to prevent collapse of the article when removed from the mold. The finishing mold cam 202 (Figs. 1 and 26) is offset inwardly at "G" to open the finishing mold and eject ware therefrom, such opening of the mold being immediately followed by downward tilting of the bottom plate (Fig. 14), the latter movement being caused by inward radial movement of the slide block 200 which has link connection with the bottom plate 207.

In Fig. 26, the cam 184 which controls operation of the motor 165 designed to oscillate the ram, is shown as provided with a single offset portion "H," whereas in actual practice this cam will be provided with a series of such offsets individual to the mold groups or heads. This figure is more or less diagrammatic and is not intended to disclose structure, but rather the cycle of operation in the production of a single article.

In order that the machine be utilized in the production of ware of various heights (Fig. 20), the finishing molds may be variably spaced above the finishing mold frame 50 by the use of adapters 301 which may be of varying thickness as determined by the type of ware being produced.

Modifications may be resorted to within the spirit and scope of the appended claims.

What I claim is:

1. In a machine for forming hollow glassware, the combination of an annular series of finishing molds rotatable about a vertical axis, a single parison mold common to all of the finishing molds, means to move the parison mold radially of the machine from a charge gathering position and then circumferentially of the machine with a finishing mold to a parison transfer position, and means to completely form a parison in the parison mold prior to arrival of said mold at the transfer position.

2. In a machine for forming hollow glassware, the combination of an annular series of finishing molds rotatable about a vertical axis, a single parison mold common to all of the finishing molds, means to move the parison mold radially of the machine from a charge gathering position and then circumferentially of the machine with a finishing mold to a parison transfer position, and means to completely form a parison in the parison mold prior to arrival of said mold at the point of initial circumferential movement of the molds in unison.

3. In a glassware forming machine, the combination of a rotary mold carriage, finishing molds thereon, a parison mold periodically movable radially inward toward the center of the machine from a charge gathering position to a position in the path of travel of the finishing molds, means to completely form a parison in the parison mold and open said mold during each said inward movement prior to arrival at the position in the path of travel of the finishing mold, means to move the parison mold circumferentially together with each finishing mold in succession a predetermined distance, and means to transfer the parisons to the finishing molds during said circumferential movements.

4. In a glassware forming machine, the combination of an annular series of finishing molds rotatable about a vertical axis, a parison forming unit reciprocable radially above said finishing molds, cam actuated mechanism for reciprocating said parison forming unit between charge gathering and blank transfer positions, an air motor, and mechanism actuated by said air motor to move the parison forming unit with the finishing molds for predetermined periods of time during transfer of blanks to said finishing molds.

5. In a glassware forming machine, the combination of an annular series of finishing molds rotatable about a vertical axis, a ram arranged in a plane above said molds, a parison mold mounted on the outer end of said ram and common to all of the finishing molds, means to reciprocate the ram radially of the machine to move the parison mold between charge gathering and blank transfer positions, means to apply vacuum to the parison mold while in charge gathering position and during a portion of the movement of the mold to the blank transfer position, means to move the ram and parison mold circumferentially a predetermined distance with the finishing molds, means to transfer a parison to a finishing mold during said circumferential movement, and means to then return the parison mold to the charge gathering position by a negative movement of said parison mold relative to the finishing mold movement.

6. In a glassware forming machine, the combination of an annular series of finishing molds rotatable about a vertical axis, a ram arranged in a plane above said molds, a parison mold mounted on the outer end of said ram and common to all of the finishing molds, means to reciprocate the ram radially of the machine to move the parison mold between charge gathering and blank transfer positions, means to apply vacuum to the parison mold while in charge gathering position and during a portion of the movement of the mold to the blank transfer position, means to move the ram and parison mold circumferentially a predetermined distance with the finishing molds, means to transfer a parison to a finishing mold during said circumferential movement, means to then return the parison mold to the charge gathering position by a negative movement of said parison mold relative to the finishing mold movement, said means for moving the parison mold circumferentially including an air motor, and means actuated by circumferential movement of the finishing molds to control the periods of operation of said motor.

7. In a glassware forming machine, the combination or an annular series of finishing molds rotatable about a vertical axis, a ram arranged in a plane above said molds, a parison mold mounted on the outer end of said ram and common to all of the finishing molds, means to reciprocate the ram radially of the machine to move the parison mold between charge gathering and blank transfer positions, means to apply vacuum to the parison mold while in charge gathering position and during a portion of the movement of the mold to the blank transfer position, means to move the ram and parison mold circumferentially a predetermined distance with the finishing molds, means to transfer a parison to a finishing mold during said circumferential movement, means to then return the parison mold to the charge gathering position by a negative movement of said parison mold relative to the finishing mold movement, said means for moving the parison mold circumferentially including an air motor, means actuated by the circumferential movement of the finishing molds to control the periods of operation of said motor control means including a cam actuated air pressure valve, and an annular series of cams rotatable with and individual to the finishing molds.

8. In a glassware forming machine, the combination of an annular series of finishing molds rotatable about a vertical axis, a parison forming unit common to all of the finishing molds, means to move the unit radially inward from a charge gathering position to a position over the path of travel of the finishing molds, means to move said unit along said path with the finishing molds one at a time a predetermined distance, means to transfer parisons to the finishing molds during the last named movement, and means to return said unit to the charge gathering position along a substantially straight line path from the point of completion of the parison transfer.

9. In a glassware forming machine, the combination of a parison forming unit including a partible blank mold, a partible neck mold associated therewith, means to move the unit radially of the machine between a charge gathering position and a parison transfer position, means to open the blank mold prior to arrival at the parison transfer position, means operable after arrival of the unit at the transfer position to impart an additional opening movement to the blank mold, means actuated by said additional opening movement of the blank mold to open the neck mold, an annular series of partible finishing molds rotatable about a vertical axis and thereby brought in succession to said parison transfer position, means operating automatically to close the finishing molds about the parisons, and mechanism to move the parison forming unit with each of the finishing molds in succession during transfer of parisons to the latter.

10. In a glassware forming machine, the combination of a parison forming unit including a partible blank mold, a partible neck mold associated therewith, means to move the unit radially of the machine between a charge gathering position and a parison transfer position, means to open the blank mold prior to arrival at the parison transfer position, means operable after arrival of the unit at the transfer position to impart an additional opening movement to the blank mold, means actuated by said additional opening movement of the blank mold to open the neck mold, an annular series of partible finishing molds rotatable about a vertical axis and thereby brought in succession to said parison transfer position, means operating automatically to close the finishing molds about the parisons, mechanism to move the parison forming unit with the finishing molds during transfer of parisons to the latter, and means to adjust the last named mechanism to control the extent of movement of said parison forming unit with the finishing molds.

11. In a glassware forming machine, the combination with an annular series of finishing molds rotatable about a vertical axis and thereby brought in succession to a parison transfer position, of a parison forming unit including a partible blank mold and a partible neck mold associated therewith, means to move the unit radially of the machine between a charge gathering position and the parison transfer position, means to open the blank mold prior to arrival at the parison transfer position, means operable after arrival of the unit at the transfer position to impart an additional opening movement to the blank mold, means actuated by said additional opening movement of the blank mold to open the neck mold, said first mentioned means including a reciprocable ram carrying said parison forming unit, and mechanism for oscillating the ram to thereby move said parison forming unit a predetermined distance with each finishing mold.

12. In a glassware forming machine, the combination with an annular series of finishing molds rotatable about a vertical axis and thereby brought in succession to a parison transfer position, of a parison forming unit including a partible blank mold and a partible neck mold associated therewith, means to move the unit radially of the machine between a charge gathering position and the parison transfer position, means to open the blank mold prior to arrival at the parison transfer position, means operable after arrival of the unit at the transfer position to impart an additional opening movement to the blank mold, means actuated by said additional opening movement of the blank mold to open the neck mold, said first mentioned means including a reciprocable ram carrying said parison forming unit, mechanism for oscillating the ram to thereby move said parison forming unit a predetermined distance with each finishing mold, and automatic means to transfer a parison from said unit to a finishing mold during movement of said unit and mold together.

13. In a glassware forming machine, the combination of a rotatable annular series of finishing molds, a charge gathering and parison forming unit common to all of said molds, said unit including a partible suction blank mold and a partible neck mold therefor; mechanism for transferring parisons from said unit to the finishing molds in succession including means to reciprocate the blank and neck mold unit radially between charge gathering and blank transfer positions, means to open the blank mold prior to arrival at the blank transfer station, means to impart additional opening movement to the blank mold after arrival at said transfer station, means whereby said additional opening movement of the blank mold opens the neck mold and releases the parison, means to close a finishing mold about the parison prior to its release from the neck mold, and means for causing said unit to travel with the finishing molds during the transfer of the parison.

Signed at Toledo, in the county of Lucas and State of Ohio, this 24th day of April, 1928.

LEONARD D. SOUBIER.